Oct. 10, 1939.  R. W. ROBINSON ET AL  2,175,214
CANDY BAR
Filed Oct. 26, 1938
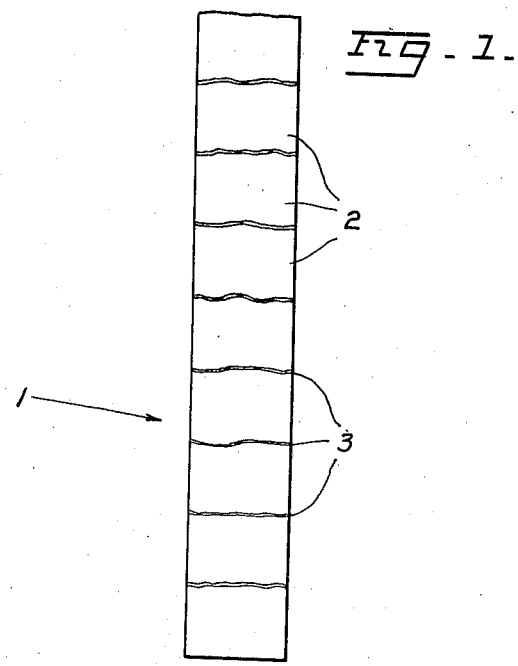
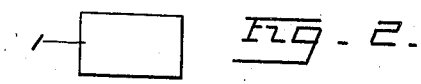
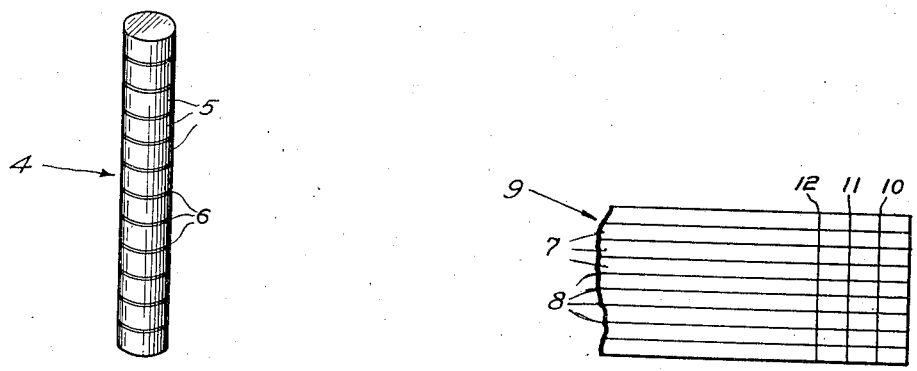
INVENTORS
REED W. ROBINSON
ANDREW OLSEN, JR.
BY
ATTORNEY.

Patented Oct. 10, 1939

2,175,214

UNITED STATES PATENT OFFICE 2,175,214

CANDY BAR

Reed W. Robinson and Andrew Olsen, Jr., San Francisco, Calif.

Application October 26, 1938, Serial No. 237,028

5 Claims. (Cl. 99—180)

This invention relates to candy bars, and has for its principal object a means for making an improved candy bar, and the bar itself, whereby the breaking off or biting off of suitably sized sections for eating will be greatly facilitated; also a new type of candy bar as of caramel or other consistency which will afford the convenience of small pieces of the candy, yet avoid the necessity of individual wrapping as at present required with this type of candy.

Other features and advantages of the invention will appear in the following description and accompanying drawing.

In the drawing

Figure 1 is a side view of a candy bar made in accordance with our invention.

Figure 2 shows an end view of the bar of Figure 1.

Figure 3 illustrates a method of making the candy bar of Figure 1.

Figure 4 shows in perspective a round candy bar or stick of candy made in accordance with our invention.

Before describing the invention in detail, it may be stated that it was conceived as a result of studying the problem of commercially produced caramels, and for which purpose it has exceptional value. Caramels as made and stocked for the candy stand trade are cut to small squares or oblong pieces suitable for eating, and they are each separately wrapped in wax paper or Cellophane, or otherwise separated by wax papers, and besides this are generally packed in five cent packages consisting of a single row of the individually wrapped caramels supported on a narrow piece of cardboard so as to make a stiff assemblage and the whole again wrapped in Cellophane or the like.

The cost of this compound wrapping thus becomes a large cost factor in putting out low priced candies. However, with caramels this cannot be avoided, for they could not be made in bar form and scored as could a hard, dry candy, for the score lines would slowly coalesce until a continuous tough bar resulted which would be too hard and tough to bite off, and also too tough and stringy to break off.

In studying the above problem as large commercial manufacturers of candy bars, we tried various means to provide a candy bar of caramel, and/or other candies including "chews", chew-nougats, brittles and hard candies, which would be in the form of a self-supporting bar to permit single wrapping of the bar only, yet also permit the consumer to easily break off or bite off suitable pieces for eating, of predetermined size.

We discovered after various trials, several specific means of carrying out the broad idea of a transversely separable candy bar, but all based on providing a unitary candy bar formed with dividing layers of an edible material, preferably itself of candy of a type which would permit easy separation of consecutive short transverse sections of the bar either by breaking apart or biting a section from the bar.

In Figure 1 one form of our improved separable candy bar is shown, and it consists of a rigid candy bar 1, formed of sections 2, suitably sized for eating, as of caramels, all of the same flavor, or of assorted flavors, all bound together by thin separating layers or joints of easily separable edible material 3, preferably such as a normally soft and weak candy, as of fondant, fudge, or grained nougat, or other tender type of candy.

Such a candy bar may be wrapped like any ordinary candy bar, yet at any future time may have its sections easily broken away one at a time along the soft or easily frangible cementing layers 3, or may be bitten off along any of said layers upon turning down the wrapping sufficiently.

We prefer to make the separating lyers of a different color than the body of the candy so that the lines of breakage will be easily seen. Thus the layers may be light colored or white for dark colored candy bars and vice versa.

While the invention, as stated, is particularly applicable to tough candies which ordinarily resist biting off of a suitable piece, and also are difficult if not almost impossible to break, it nevertheless also has value in hard candy sticks, and is shown in Figure 4 as applied to a round stick 4 of hard candy, and of which 5 are the predetermined size sections, and 6 represents the frangible or separable joint between them. The candy bar and its sections may of course be of any shape and of any kind of candy mixture of several kinds. The invention may likewise be applied to black licorice sticks which are notably difficult to do anything with after they are purchased and usually require splitting apart with a knife and hammer.

A convenient way to make the rectangular form of separable bar shown in Figure 1 is to cast successive superimposed layers of molten caramel or the desired candy as shown at 7 in Figure 3 while first permitting each layer to set before pouring the next and applying to the surface of the set layer a coating 8 of the desired separating material, as above described. Or the precast layers of candy may be pressed together after becoming set, with the separating coats or layers applied before pressing together.

Such a pile or block equal in height to the desired length of the candy bar is indicated at 9 in Figure 3, and may then have sucecssive composite slabs cut off of it as indicated at 10, 11, 12 and these later are cut in the opposite plane (parallel to the drawing sheet) to form the desired candy bars.

We are of course aware of the various candies, particularly the soft candies, jellies, etc. being made in layers, but these layers run lengthwise of the pieces, and not transversely nor are they made in the form of the popular candy bar, to which business the present invention is addressed, nor do they form transversely separable sections of any candy bar, nor of a caramel bar, and hence do not solve the problem which is effectively disposed of by the present invention.

It is to be understood that while the separating layers will generally be fairly straight, they need not necessarily be so as long as they extend generally transversely of the candy bar to carry out the purpose of the invention as above set out.

We claim:

1. A candy bar of elongated form provided with spaced layers of easily separated edible material extending across the bar to facilitate easy breaking or biting off of sections of the bar along said layers.

2. A candy bar of elongated form provided with spaced transversely extending layers of a more easily separated candy material to facilitate easy breaking or biting off sections of the bar along said layers.

3. A candy bar of elongated form provided with spaced transversely extending layers of a relatively soft easily separated candy material to facilitate easy breaking or biting off sections of the bar along said layers.

4. A candy bar as set out in claim 2 in which the candy is of the tough caramel type and the separating layers are of the soft nougat, fudge or fondant type.

5. A candy bar as set out in claim 1 in which the layers adapted to be easily fractured or separated are of a distinctive color from that of the body of the candy bar.

REED W. ROBINSON.
ANDREW OLSEN, Jr.